(12) United States Patent
Song

(10) Patent No.: US 7,738,716 B2
(45) Date of Patent: Jun. 15, 2010

(54) ENCODING AND DECODING APPARATUS AND METHOD FOR REDUCING BLOCKING PHENOMENON AND COMPUTER-READABLE RECORDING MEDIUM STORING PROGRAM FOR EXECUTING THE METHOD

(75) Inventor: Byung-cheol Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1115 days.

(21) Appl. No.: 11/389,230

(22) Filed: Mar. 27, 2006

(65) Prior Publication Data

US 2006/0269149 A1 Nov. 30, 2006

(30) Foreign Application Priority Data

May 24, 2005 (KR) .................... 10-2005-0043771

(51) Int. Cl.
*G06K 9/36* (2006.01)
(52) U.S. Cl. ..................................... 382/239
(58) Field of Classification Search ................. 382/239
See application file for complete search history.

(56) References Cited

U.S. PATENT DOCUMENTS

| | | | | |
|---|---|---|---|---|
| 4,723,161 A | * | 2/1988 | Koga | 375/240.16 |
| 5,001,559 A | * | 3/1991 | Gonzales et al. | 348/400.1 |
| 5,343,420 A | * | 8/1994 | Murata et al. | 708/819 |
| 6,002,440 A | * | 12/1999 | Dalby et al. | 375/240.12 |
| 6,144,772 A | * | 11/2000 | Garland et al. | 382/239 |
| 6,487,317 B1 | * | 11/2002 | Small | 382/240 |

FOREIGN PATENT DOCUMENTS

| | | |
|---|---|---|
| JP | 05-110871 A | 4/1993 |
| JP | 10-224790 A | 8/1998 |
| KR | 10-2002-0095761 A | 12/2002 |
| KR | 10-2003-0040974 A | 5/2003 |

* cited by examiner

*Primary Examiner*—Wenpeng Chen
(74) *Attorney, Agent, or Firm*—Sughrue Mion, PLLC

(57) ABSTRACT

Provided is an encoding method capable of reducing a blocking phenomenon that occurs when moving-images are encoded and decoded. The method includes: performing a first encoding operation on an input image using a first quantization coefficient; generating a reconstructed image of the encoded image; calculating a difference between corresponding partial images of the reconstructed image and the input image; and performing a second encoding operation on the calculated difference using a second quantization coefficient smaller than the first quantization coefficient. Using the second encoded difference, a decoding unit can reconstruct an image of a block boundary portion more elaborately with a small number of bits, thereby significantly reducing the blocking phenomenon in the decoding operation.

55 Claims, 10 Drawing Sheets

ENCODING AND DECODING APPARATUS
AND METHOD FOR REDUCING BLOCKING
PHENOMENON AND
COMPUTER-READABLE RECORDING
MEDIUM STORING PROGRAM FOR
EXECUTING THE METHOD

BACKGROUND OF THE INVENTION

This application claims priority from Korean Patent Application No. 10-2005-0043771, filed on May 24, 2005, in the Korean Intellectual Property Office, the disclosure of which is incorporated herein in its entirety by reference.

1. Field of the Invention

Apparatuses and methods consistent with the present invention relate to encoding and decoding moving images, and more particularly, to a moving-image encoding and decoding apparatus and method that can reduce a blocking phenomenon.

2. Description of the Related Art

All moving-image codecs including MPEG2, MPEG4, H.264, and VC1 suffer from a blocking phenomenon as a result of block-based processing and quantization. To solve this problem, H.264 and VC1 codecs use a loop filter. However, since a loop filter cannot fully eliminate the blocking phenomenon, post-processing, such as de-blocking or de-ringing, is required for a decoder.

FIG. 1 is a view for explaining a de-blocking algorithm, which is a post-processing algorithm introduced in the MPEG4 standard. The de-blocking algorithm includes two modes, i.e., a DC offset mode and a default mode, which are applied according to characteristics of boundary pixels. The DC offset mode is applied to a region where the blocking phenomenon occurs due to a small DC offset, and the default mode is applied to other regions.

Which of the two modes will be used is determined by the characteristics of boundary pixels and a threshold value. In the default mode, adaptive signal processing is performed in block regions $S_0$, $S_1$, and $S_2$ to eliminate the blocking phenomenon and, simultaneously, highlight detail characteristics of an image. However, since the blocking phenomenon cannot be fully eliminated in the default mode, the DC offset mode is required. In the DC offset mode, horizontal edge pixels are filtered before vertical edge pixels.

In the MPEG4 and AVC/H.264 standards, a de-blocking filter is included in a loop of an encoder to enhance de-blocking and encoding efficiency.

As described above, conventional de-blocking methods rely on a threshold value and cannot eliminate the blocking phenomenon that occurs during quantization which is performed to attain a target bit rate.

A conventional method of filtering a blocking noise from an input image is disclosed in U.S. Pat. No. 6,360,024.

SUMMARY OF THE INVENTION

The present invention provides an image encoding and decoding method in which error information of a block boundary image is adaptively encoded and decoded to significantly reduce a blocking phenomenon without increasing the number of transmission bits.

The present invention also provides an image encoding and decoding method in which errors in a block boundary portion of an image are reflected when a reference image is generated and motion compensation is performed based on the errors to prevent the propagation of the blocking phenomenon.

According to an aspect of the present invention, there is provided an image encoding method including: performing a first encoding operation on an input image using a first quantization coefficient; generating a reconstructed image of the encoded image; and performing a second encoding operation on a difference between the reconstructed partial image and a corresponding partial image of the input image, using a second quantization coefficient smaller than the first quantization coefficient. The partial image may correspond to a block boundary portion of the image.

The first encoding operation may include: performing a first transform operation on the input image; and performing a first quantization operation on the input image on which the first transform operation is performed, using the first quantization coefficient, and the generation of the reconstructed image may include: performing a de-quantization operation corresponding to the first quantization operation; performing an inverse transform operation which corresponds to the first transform operation on the de-quantized image; and generating the reconstructed image based on the inverse-transformed image.

The second encoding operation may include: performing a second transform operation on the difference; and performing a second quantization operation on the transformed difference using the second quantization coefficient.

The second encoding operation may be performed only when the difference exceeds a predetermined threshold. The first encoding operation may be performed by a predetermined codec that performs a quantization operation.

The method may further include: decoding the encoded difference; storing a reference image generated using the reconstructed image and the decoded difference; and performing motion compensation based on the stored reference image.

According to another aspect of the present invention, there is provided an image encoding apparatus including: a first encoding unit which performs a first encoding operation on an input image using a first quantization coefficient; and a second encoding unit which performs a second encoding operation on a difference between a reconstructed partial image and a corresponding partial image of the input image, using a second quantization coefficient smaller than the first quantization coefficient.

According to another aspect of the present invention, there is provided a computer-readable recording medium on which a program for executing an image encoding method is recorded, the method including: performing a first encoding operation on an input image using a first quantization coefficient; generating a reconstructed partial image of the first-encoded input image; and performing a second encoding operation on a difference between the reconstructed partial image and a corresponding partial image of the input image, using a second quantization coefficient smaller than the first quantization coefficient.

According to another aspect of the present invention, there is provided an image decoding method including: performing a first decoding operation on image data of an input bitstream comprising an encoded image; performing a second decoding operation on partial image difference data of the input bitstream; wherein the difference data is obtained by encoding a difference between a partial image of the image and a corresponding reconstructed partial image; and wherein the corresponding reconstructed partial image is obtained by decoding a corresponding portion of the encoded image; and generating a reconstructed image using the first-decoded image data and the second-decoded difference data.

The first decoding operation may include: performing a first de-quantization operation on the image data; and performing a first inverse transform operation on the image data on which the first de-quantization operation is performed, and the second decoding operation may include: performing a second de-quantization operation on the difference data; and performing a second inverse transform operation on the difference data on which the second de-quantization operation is performed.

The method may further include variable-length-coding an input bitstream and extracting the image data and the difference data from the input stream. The reconstructed image may be used for motion compensation of another image.

According to another aspect of the present invention, there is provided an image decoding apparatus including: a first decoding unit which performs a first decoding operation on image data of an input bitstream comprising an encoded image; a second decoding unit which performs a second decoding operation on difference data of the input bitstream, wherein the difference data is obtained by encoding a difference between a partial image of the image and a corresponding reconstructed partial image; and wherein the corresponding reconstructed partial image is obtained by decoding a corresponding portion of the encoded image; and a reconstructed image generating unit which generates a reconstructed image using the first-decoded image data and the second-decoded difference data.

According to another aspect of the present invention, there is provided a computer-readable recording medium on which a program for executing an image decoding method is recorded, the method including: performing a first decoding operation on image data of an input bitstream comprising an encoded image; performing a second decoding operation on difference data of the input bitstream, wherein the difference data is obtained by encoding a difference between a partial image of the image and a corresponding reconstructed partial image; and wherein the corresponding reconstructed partial image is obtained by decoding a corresponding portion of the encoded image; and generating a reconstructed image using the first-decoded image data and the second-decoded difference data.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the exemplary embodiments set forth therein; rather, these exemplary embodiments are provided so that this disclosure will be thorough and complete, and will fully convey the concept of the invention to those skilled in the art.

Figure 1:
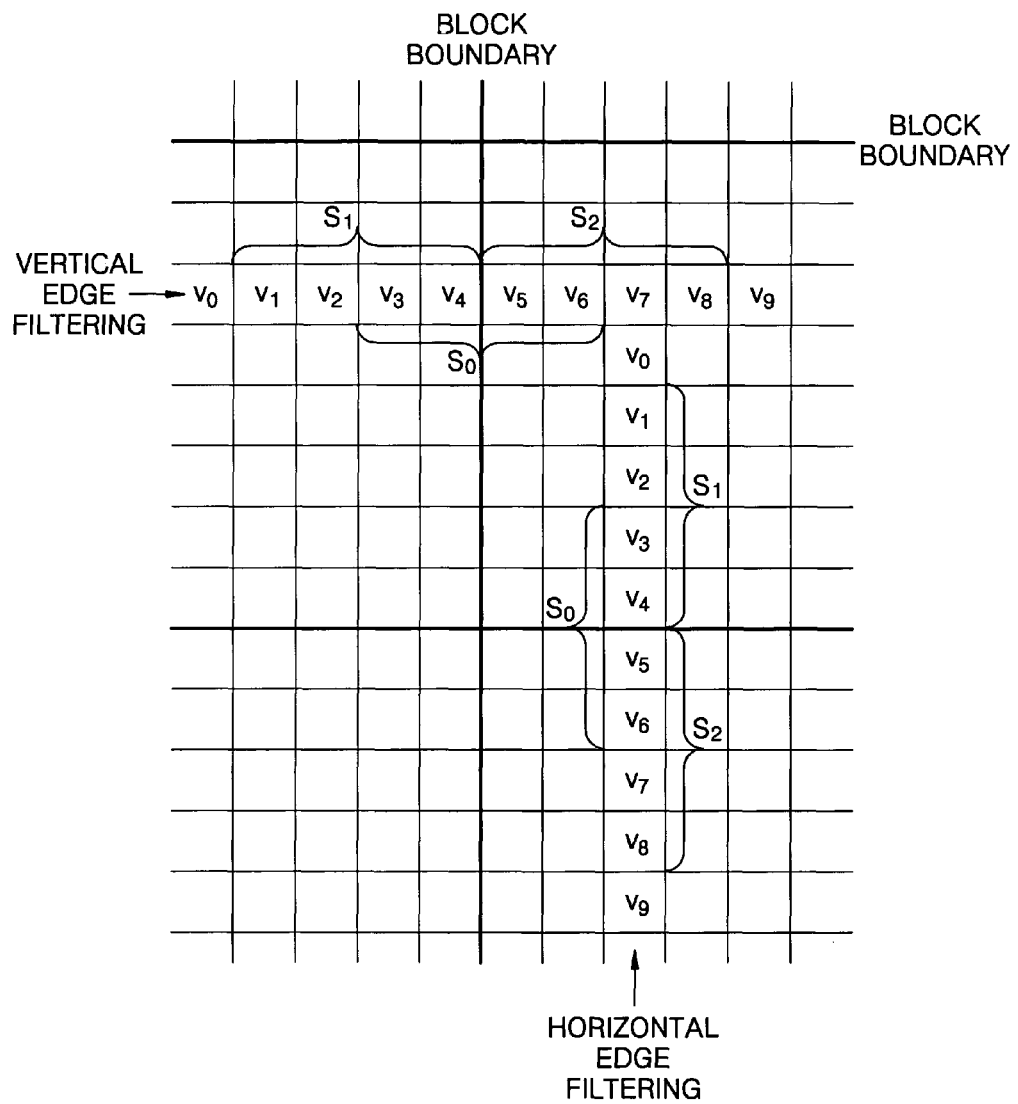
FIG. 1 is a view for explaining a conventional de-blocking algorithm.
Figure 2:
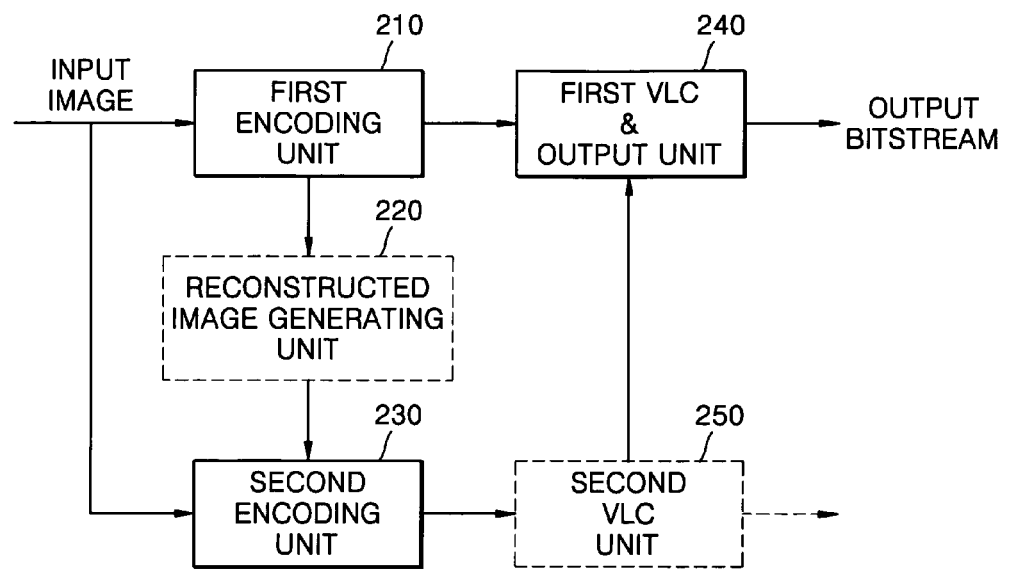
FIG. 2 is a block diagram of an encoding apparatus according to an embodiment of the present invention.

FIG. 2 is a block diagram of an encoding apparatus according to an exemplary embodiment of the present invention. Referring to FIG. 2, the encoding apparatus includes a first encoding unit 210, a reconstructed image generating unit 220, a second encoding unit 230, a first variable length coding (VLC) & output unit 240, and a second VLC unit 250.

The first encoding unit 210 encodes an input image using a predetermined first quantization coefficient and outputs first encoded data to the first VLC & output unit 240. The first encoding unit 210 may be an MPEG2, H.264, VC1, or MPEG4 encoder that performs quantization. For example, if the first encoding unit 210 is an MPEG2 encoder, it includes a discrete cosine transform (DCT) unit for transforming an input image and a quantizer for quantizing DCT coefficients. An exemplary embodiment of the first encoding unit 210 will be described in detail later with reference to FIG. 4.

The reconstructed image generating unit 220 reconstructs an image encoded by the first encoding unit 210. For example, if the first encoding unit 210 transforms and quantizes an input image, the reconstructed image generating unit 220 inversely transforms and de-quantizes the transformed and quantized image. If the first encoding unit 210 is an MPEG2 encoder, the reconstructed image generating unit 220 may not be included since an image reconstructed to generate a reference image for MPEG2 encoding can be used. In the present exemplary embodiment, the reconstructed image generating unit 220 reconstructs an entire image encoded by the first encoding unit 210. However, the reconstructed image generating unit 220 may reconstruct only a partial image, for example, an image of a block boundary portion.

The second encoding unit 230 calculates the difference between an image of a portion, for example, a block boundary portion, of the reconstructed image generated by the reconstructed image generating unit 220 and a partial image of an original input image corresponding to the image of the block boundary portion. Then, the second encoding unit 230 encodes the difference using a second quantization coefficient smaller than the first quantization coefficient and outputs second encoded data.

Alternatively, the second encoding unit 230 may encode the difference only when the difference exceeds a predetermined threshold. Also, the second encoding unit 230 may calculate the difference between a portion of the reconstructed image other than the block boundary portion and a portion of the original image which corresponds to the portion of the reconstructed image, and encode the difference only when the difference exceeds a predetermined threshold. If the difference between values of pixels adjacent to the block boundary portion in the reconstructed image exceeds a predetermined threshold, the second encoding unit 230 may encode the difference.

The first VLC & output unit 240 variable-length-codes the first encoded data received from the first encoding unit 210 to produce first variable-length-coded data, multiplexes the first variable-length-coded data with the second variable-length-coded data received from the second VLC encoding unit 250, and outputs the multiplexed result.

The second VLC unit 250 variable-length-codes the second encoded data received from the second encoding unit 230 to produce second variable-length-coded data and outputs the second variable-length-coded data to the first VLC encoding & output unit 240.

Alternatively, the second variable-length-coded data may be transmitted to a decoding apparatus without being multiplexed with the first variable-length-coded data. For example, the first encoded data may be transmitted to a base layer and the second encoded data may be transmitted to an enhanced layer so that the decoding apparatus can selectively decode the first encoded data or the second encoded data.

The second VLC unit 250 may be included in the second encoding unit 230 or may not be used.

Figure 3:
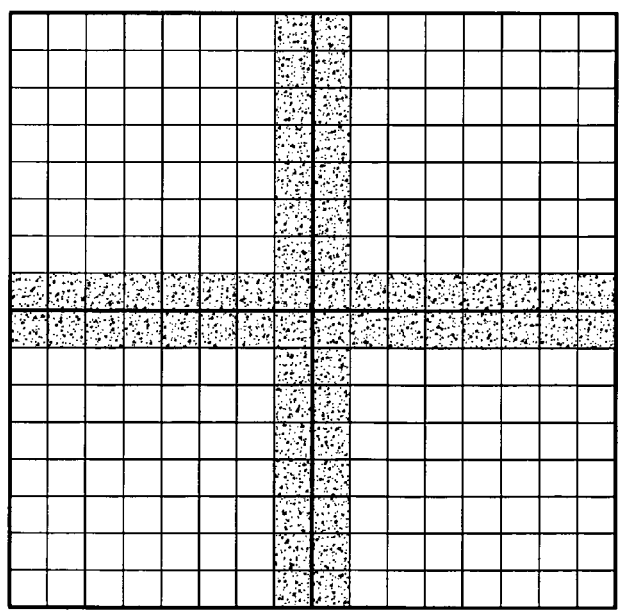
FIG. 3 illustrates block boundary pixels to which the present invention is applied.

FIG. 3 illustrates a partial image, that is, block boundary pixels. In FIG. 3, dark portions indicate pixels to be encoded by the second encoding unit 230 of FIG. 2. The second encoding unit 230 of FIG. 2 calculates the difference between a value of a block boundary pixel in an image reconstructed by the reconstructed image generating unit 220 and a value of a block boundary pixel in an original image which corresponds to the block boundary pixel in the reconstructed image, and encodes the difference.

Figure 4:
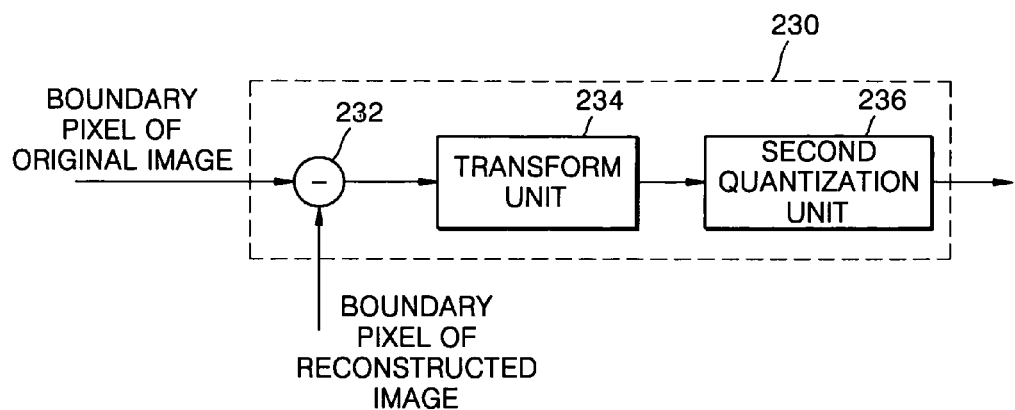
FIG. 4 is a detailed block diagram of a second encoding unit illustrated in FIG. 2.

FIG. 4 is a detailed block diagram of the second encoding unit 230 of FIG. 2. Referring to FIG. 4, the second encoding unit 230 includes a difference calculation unit 232, a transform unit 234, and a second quantization unit 236.

The difference calculation unit 232 calculates the difference between a partial image, for example, a block boundary pixel, of a reconstructed image generated by the reconstructed image generating unit 220 and a block boundary pixel in an original input image which corresponds to the block boundary pixel in the reconstructed image.

The transform unit 234 performs a predetermined transform operation, for example, a DCT transform, an integer transform or a hadamard transform operation, on the calculated difference.

The second quantization unit 236 quantizes the transformed difference using the second quantization coefficient smaller than the first quantization coefficient. In the present exemplary embodiment, the second quantization unit 236 encodes the difference between all partial images. However, the second quantization unit 236 may adaptively encode the calculated difference only when the calculated difference between partial images exceeds a predetermined threshold.

Alternatively, the second encoding unit 230 may include a VLC unit (not shown) that variable-length-codes partial image data encoded using the second quantization coefficient.

Figure 5:
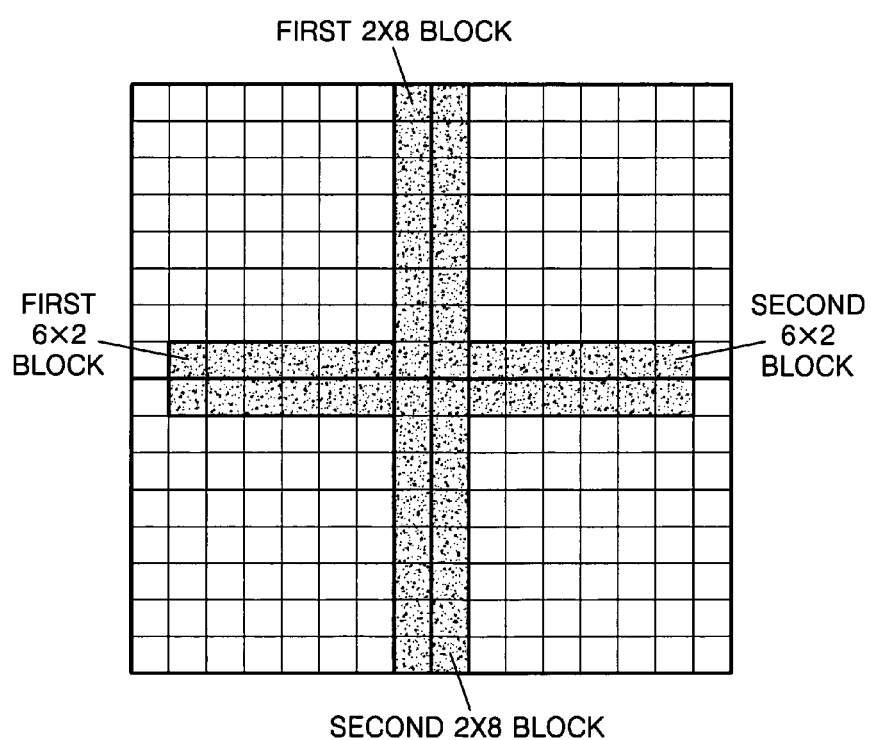
FIG. 5 illustrates encoding units of the second encoding unit illustrated in FIG. 2 according to an embodiment of the present invention.

FIG. 5 illustrates encoding units of the second encoding unit 230 of FIG. 2 according to an exemplary embodiment of the present invention. If the encoding unit of the first encoding unit 210 is a macroblock unit, block boundary pixels in a macroblock are divided into two 2×8 blocks of block boundary pixels along a vertical edge and two 2×6 blocks of block boundary pixels along a horizontal edge as illustrated in FIG. 5. Then, the differences between values of the block boundary pixels in the four blocks of the original input image and the reconstructed image are transformed, quantized, and variable-length-coded accordingly.

Figure 6:
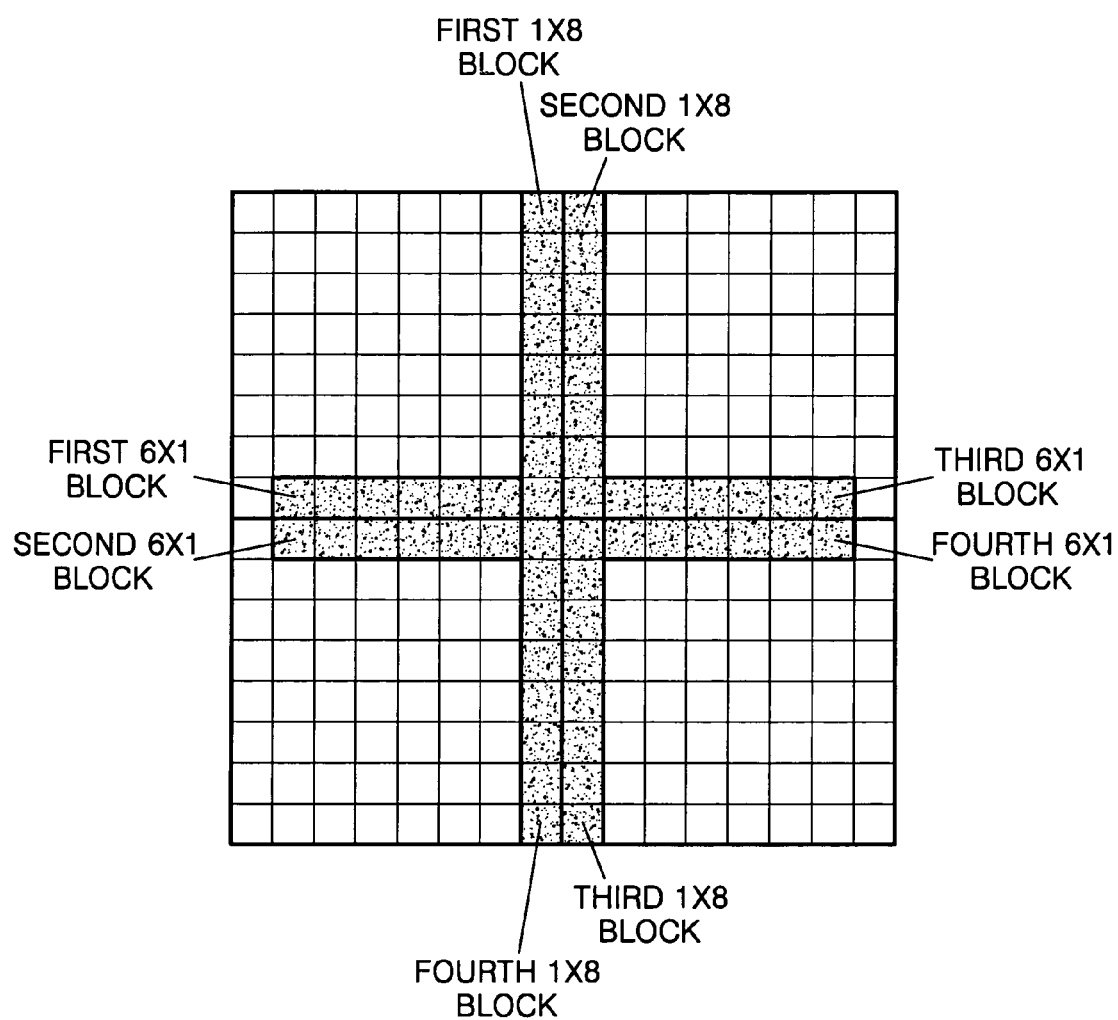
FIG. 6 illustrates encoding units of the second encoding unit illustrated in FIG. 2 according to another embodiment of the present invention.

FIG. 6 illustrates encoding units of the second encoding unit 230 of FIG. 2 according to another exemplary embodiment of the present invention. If the encoding unit of the first encoding unit 210 is a macroblock unit, block boundary pixels in a macroblock are divided into four 1×8 blocks of block boundary pixels along a vertical edge and four 1×6 blocks of block boundary pixels along a horizontal edge as illustrated in FIG. 6. Then, the differences between values of the block boundary pixels in the eight blocks of the original input image and the reconstructed image are transformed, quantized, and variable-length-coded accordingly.

In addition to the encoding units illustrated in FIGS. 5 and 6, various other encoding units may be used. For example, block boundary pixels may be encoded in units of pictures as well as in units of macroblocks or blocks. Block boundary pixels may be transformed, quantized, and variable-length-coded in units of one or two-dimensional blocks.

Figure 7:
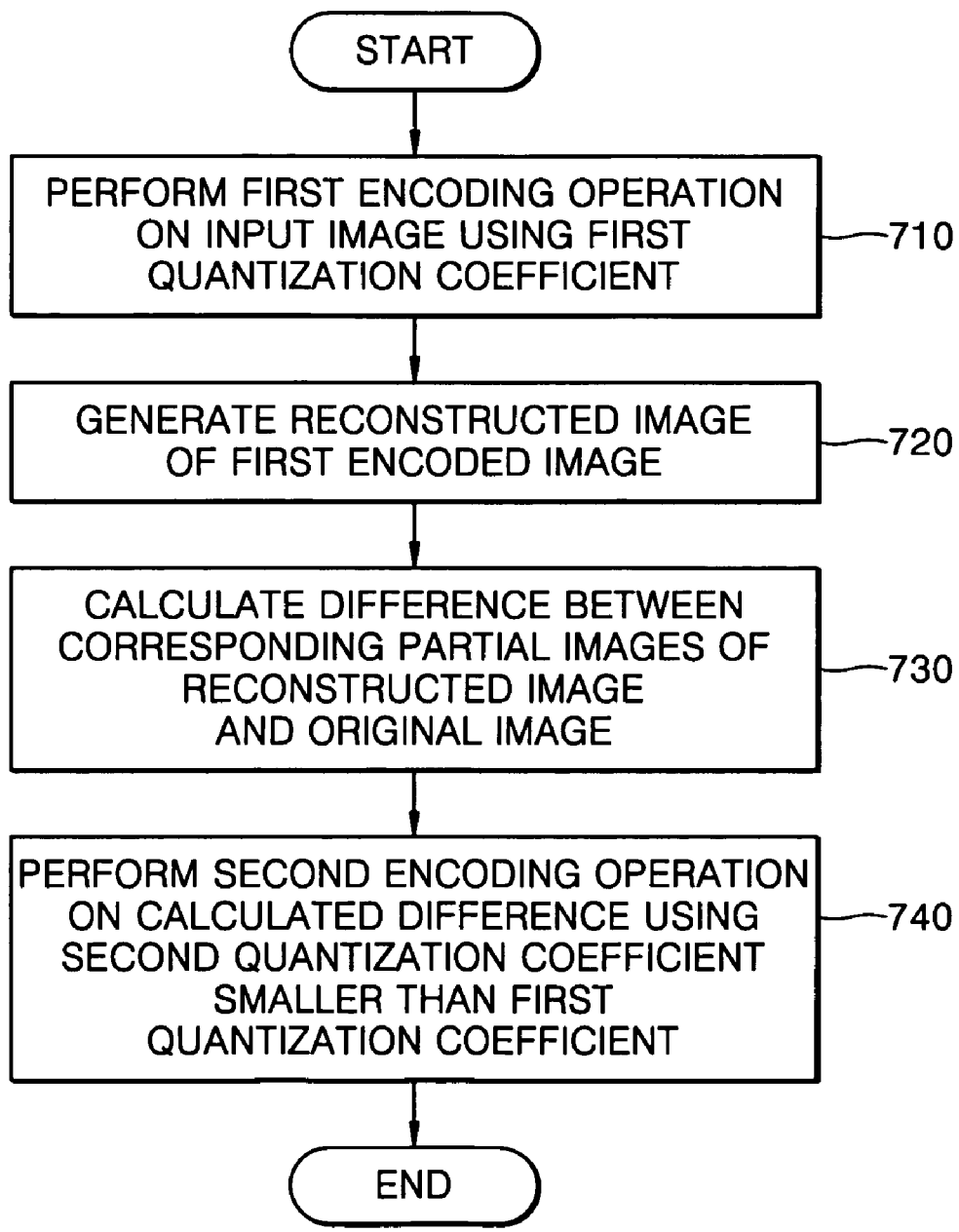
FIG. 7 is a flowchart illustrating an encoding method according to an embodiment of the present invention.

FIG. 7 is a flowchart illustrating an encoding method used by the encoding apparatus of FIG. 2 according to an exemplary embodiment of the present invention. Referring to FIG. 7, a first encoding operation is performed on an input image using the first quantization coefficient in operation 710. The first encoding operation is performed by an encoder such as an MPEG2, H.264, VC1, or MPEG4 codec encoder. The first encoding operation may include performing a transform operation on the input image and performing a first quantization operation on the transformed image using the first quantization coefficient.

In operation 720, a reconstructed image of the first encoded image is generated. The generation of the reconstructed image may include performing a de-quantization operation on the first encoded image which corresponds to the first quantization operation, and performing an inverse transform operation on the de-quantized image, which corresponds to first transform operation. If the first encoding unit 210 is an MPEG2 codec encoder, it may use a reconstructed image generated for the first encoding operation.

In operation 730, the difference between corresponding partial images of the generated reconstructed image and an original image is calculated. In the present exemplary embodiment, a partial image is an image of a block boundary portion. The partial image may be an image of a particular portion that requires more elaborate encoding and decoding.

In operation 740, a second encoding operation is performed on the calculated difference using the second quantization coefficient smaller than the first quantization coefficient. The second encoding operation may include performing a second transform operation on the calculated difference and performing a second quantization operation on the second transformed difference using the second quantization coefficient. The second encoding operation may be performed only when the calculated difference exceeds a predetermined threshold. Furthermore, a user may decide whether to perform the second encoding operation.

Figure 8:
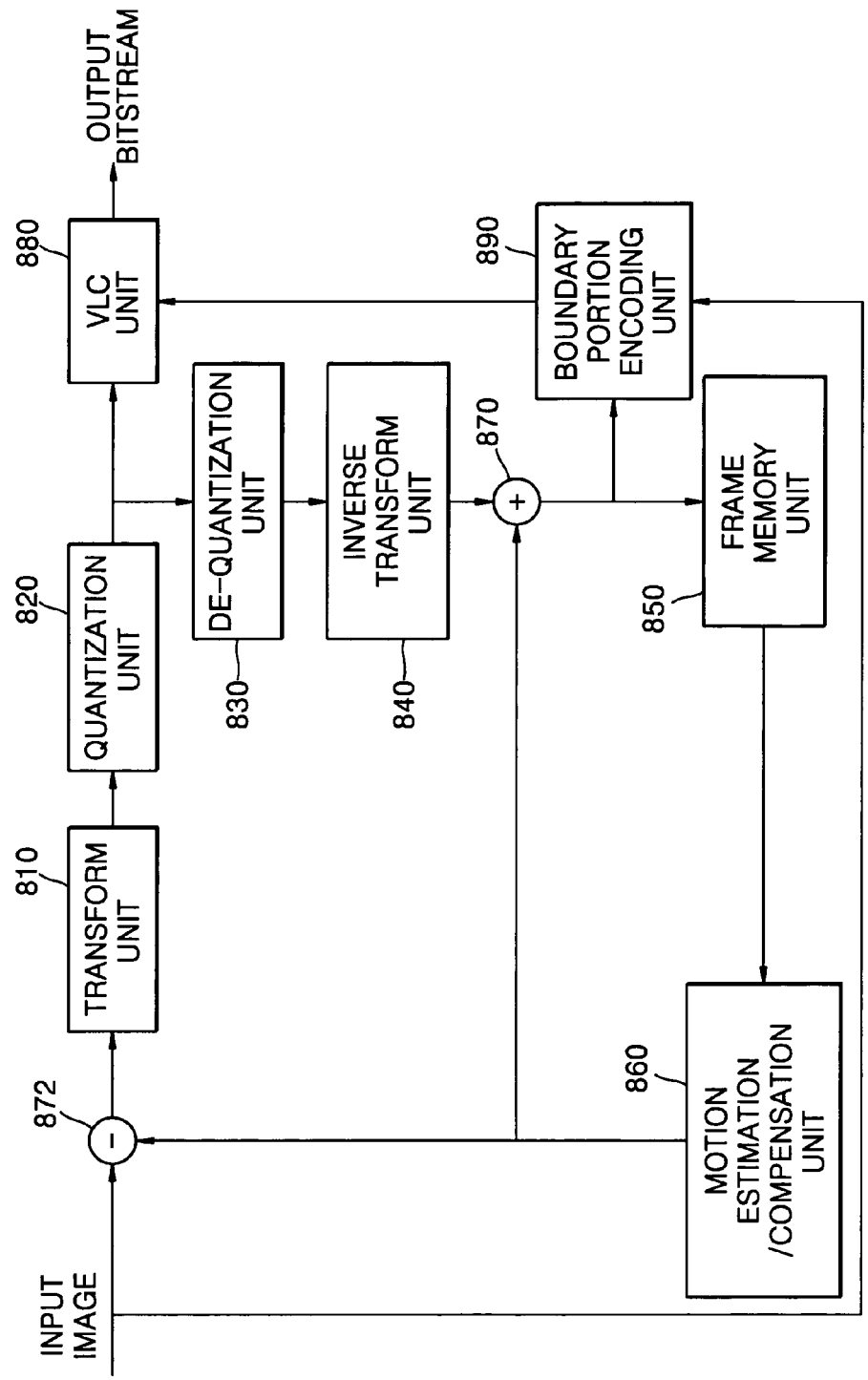
FIG. 8 is a block diagram of an encoding apparatus according to another embodiment of the present invention.

FIG. 8 is a block diagram of an encoding apparatus according to another exemplary embodiment of the present invention. The encoding apparatus includes a boundary portion encoding unit 890 in addition to an MPEG2 encoder. In the present exemplary embodiment, for the sake of convenience, an MPEG2 encoder-based encoding apparatus is described. However, an H.264, VC1, or MPEG4 codec encoder may also be employed.

Referring to FIG. 8, the encoding apparatus includes a transform unit 810, a quatization unit 820, a de-quantization unit 830, an inverse transform unit 840, a frame memory unit 850, a motion estimation/compensation unit 860, an addition unit 870, a subtraction unit 872, a VLC unit 880, and the boundary portion encoding unit 890.

The transform unit 810 performs a predetermined transform operation, such as a DCT transform or an integer transform operation, on input image data in predetermined block units, for example, 8×8 blocks, to secure spatial redundancy.

The quantization unit 820 quantizes the image data transformed by the transform unit 810 using the first quantization coefficient. The de-quantization unit 830 de-quantizes the image data quantized by the quantization unit 820.

The inverse transform unit 840 performs an inverse transform operation on the image data de-quantized by the de-quantization unit 830. The frame memory 850 stores a reconstructed image generated from the image data inverse-transformed by the inverse transform unit 840.

The motion estimation/compensation unit 860 estimates a motion vector for each macroblock using image data of a current frame and that of a previous frame stored in the frame memory unit 850 and performs motion compensation.

The addition unit 870 adds the image data inverse-transformed by the inverse transform unit 840 to the motion-compensated image from the motion estimation/compensation unit 860 and generates a reconstructed image. The VLC unit 880 removes statistical redundancy from the quantized image data.

The boundary portion encoding unit 890 calculates the difference between an image obtained from a block boundary portion of the reconstructed image and a partial image of an input original image which corresponds to the image obtained from the block boundary portion of the reconstructed image, encodes the difference in predetermined block units using the second quantization coefficient smaller than the first quantization coefficient, and outputs encoded data.

Alternatively, the boundary portion encoding unit 890 may encode the difference only when the difference exceeds a predetermined threshold. For example, if the difference calculated in units of macroblocks does not exceed the predetermined threshold, the boundary portion encoding unit 890 may be disabled. Through such adaptive encoding of a boundary portion, the encoding apparatus can limit an excessive increase in the amount of computation and transmission bits and reduce the blocking phenomenon.

In addition, encoded boundary portion data may be transmitted separately from data encoded using the first quantization coefficient. For example, the data encoded using the first quantization coefficient can be transmitted to the base layer, and the encoded boundary portion data can be transmitted to the enhanced layer. Thus, the encoded data can be adaptively reproduced according to the performance of a decoding apparatus and a display unit.

For example, by selectively using the boundary portion data transmitted to the enhanced layer, the decoding apparatus and the display unit can adaptively generate and display an image without the blocking phenomenon.

The encoded boundary portion data may be transmitted in units of macroblocks together with the data encoded using the first quantization coefficient. For example, the decoding apparatus and the display unit may selectively extract the boundary portion data inserted into a bitstream in units of macroblocks and adaptively generate and display an image without the blocking phenomenon.

As described above, since the encoding apparatus according to the present exemplary embodiment adaptively encodes and transmits error information of a boundary portion, the blocking phenomenon that occurs when image data is decoded can be reduced without an excessive increase in the amount of transmitted bits.

Figure 9:
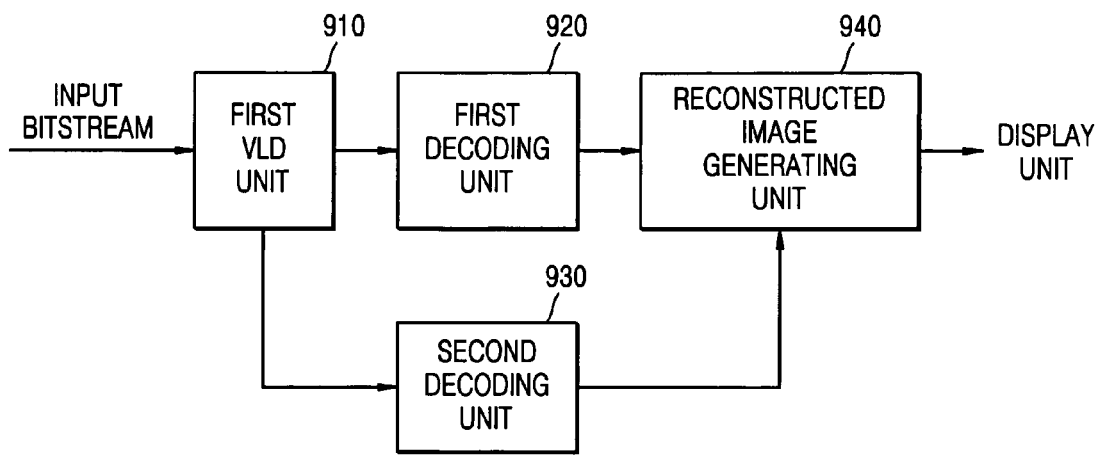
FIG. 9 is a block diagram of a decoding apparatus according to an embodiment of the present invention.

FIG. 9 is a block diagram of a decoding apparatus according to an embodiment of the present invention. Referring to FIG. 9, the decoding apparatus includes a first variable length decoding (VLD) unit 910, a first decoding unit 920, a second decoding unit 930, and a reconstructed image generating unit 940.

The first VLD unit 910 first variable-length-decodes an input bit stream and extracts image data, motion vector information, and difference between partial images. The extracted image data and the motion vector information are input to the first decoding unit 920, and the extracted difference is input to the second decoding unit 930.

The first decoding unit 920 decodes the image data and the motion vector information received from the first VLD unit 910. Here, the image data denotes data encoded using the first quantization coefficient. The first decoding unit 920 is a decoder, for example, an MPEG2, H.264, VC1, or MPEG4 decoder, which corresponds to the first encoding unit 210 of FIG. 2. If the first decoding unit 920 is an MPEG2 decoder, it includes a de-quantization unit, an inverse transform unit, and a motion compensation unit (not shown), which respectively correspond to the transform unit 810, the quantization unit 820, and the motion estimation/compensation unit 860 of FIG. 8.

The second decoding unit 930 decodes the difference between partial images received from the first VLD unit 910. The difference data denotes data encoded using the second quantization coefficient smaller than the first quantization coefficient.

The reconstructed image generating unit 940 generates a reconstructed image using information regarding an image received from the first decoding unit 920 and difference between partial images received from the second decoding unit 930 and outputs the reconstructed image to a display unit (not shown). In other words, if the block boundary images transmitted from the second decoding unit 930 are the block boundary images illustrated in FIG. 3, the difference output from the second decoding unit 930 is added to the block boundary image output from the first decoding unit 920 to generate a reconstructed image.

If 'the first encoded image data' and 'the second encoded image data' transmitted in the encoding apparatus of FIG. 2 are transmitted to the decoding apparatus through the base layer and the enhanced layer, respectively, 'the first encoded image data' transmitted to the base layer is variable-length-coded by the first VLD unit 910 and then decoded by the first decoding unit 920. Also, 'the second encoded image data' transmitted to the enhanced layer is extracted by the first VLD unit 910 and then decoded by the second decoding unit 930.

The reconstructed image generating unit 940 adds the difference decoded by the second decoding unit 930 to the image data decoded by the first decoding unit 920 and generates a reconstructed image. Alternatively, a reconstructed image may be generated using only 'the first decoded image data' transmitted to the base layer, without using the second encoded image data transmitted to the enhanced layer.

Figure 10:
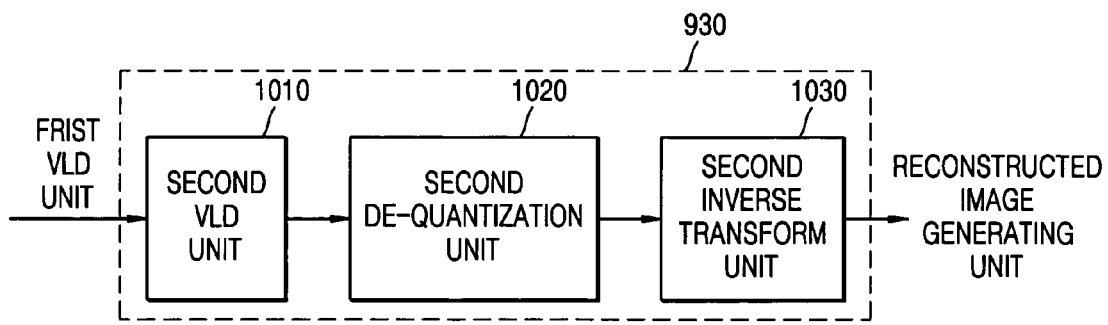
FIG. 10 is a detailed block diagram of a second decoding unit of the decoding apparatus illustrated in FIG. 9.

FIG. 10 is a detailed block diagram of the second decoding unit 930 of FIG. 9. The second encoding unit 930 includes a second VLD unit 1010, a second de-quantization unit 1020, and a second inverse transform unit 1030.

The second VLD unit 1010 second variable-length-decodes difference between partial images first variable-length-decoded by the first VLD 910 of FIG. 9. The second variable-length-decoding operation performed by the second VLD unit 1010 may be skipped when the difference has not been second variable-length-encoded.

The second de-quantization unit 1020 de-quantizes the difference decoded by the second VLD unit 1010. The de-quantization operation performed by the second de-quantization 1020 corresponds to the quantization operation performed using the second quantization coefficient smaller than the first quantization coefficient.

The second inverse transform unit 1030 performs an inverse transform operation on the difference second de-quantized by the second de-quantization unit 1020. The inverse transform performed by the second inverse transform unit 1030 may be skipped when the received difference has not been transformed.

Figure 11:
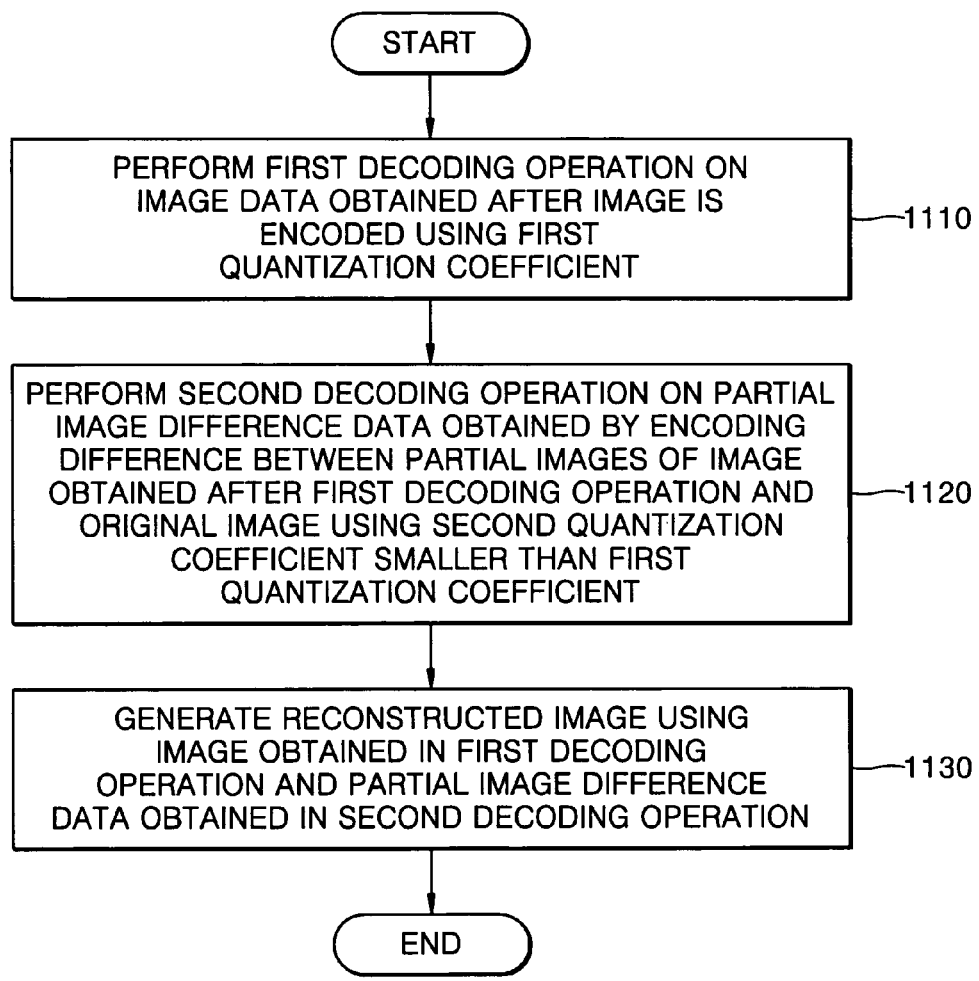
FIG. 11 is a flowchart illustrating a decoding method according to an embodiment of the present invention.

FIG. 11 is a flowchart illustrating a decoding method used by the decoding apparatus of FIG. 9 according to an exemplary embodiment of the present invention. Referring to FIG. 11, in operation 1110, a first decoding operation is performed on image data obtained after an image is encoded using the first quantization coefficient. The first decoding operation is performed by a codec decoder, such as an MPEG2, H.264, VC1, or MPEG4 codec decoder. The first decoding operation may include performing a first de-quantization operation which corresponds to the first quantization operation performed using the first quantization coefficient and performing a first inverse transform operation on an image on which the first de-quantization operation is performed.

In operation 1120, a second decoding operation is performed on the encoded difference obtained by encoding the difference between a partial image of an image obtained after the image data is decoded and a corresponding partial image of an original image using the second quantization coefficient smaller than the first quantization coefficient. The second decoding operation includes performing a second de-quantization operation on the difference which corresponds to the second quantization operation performed using the second quantization coefficient, and performing a second inverse transform operation on an image on which the second de-quantization operation is performed.

In operation 1130, a reconstructed image is generated using an image obtained in the first decoding operation and the partial image differential data obtained in the second decoding operation.

Figure 12:
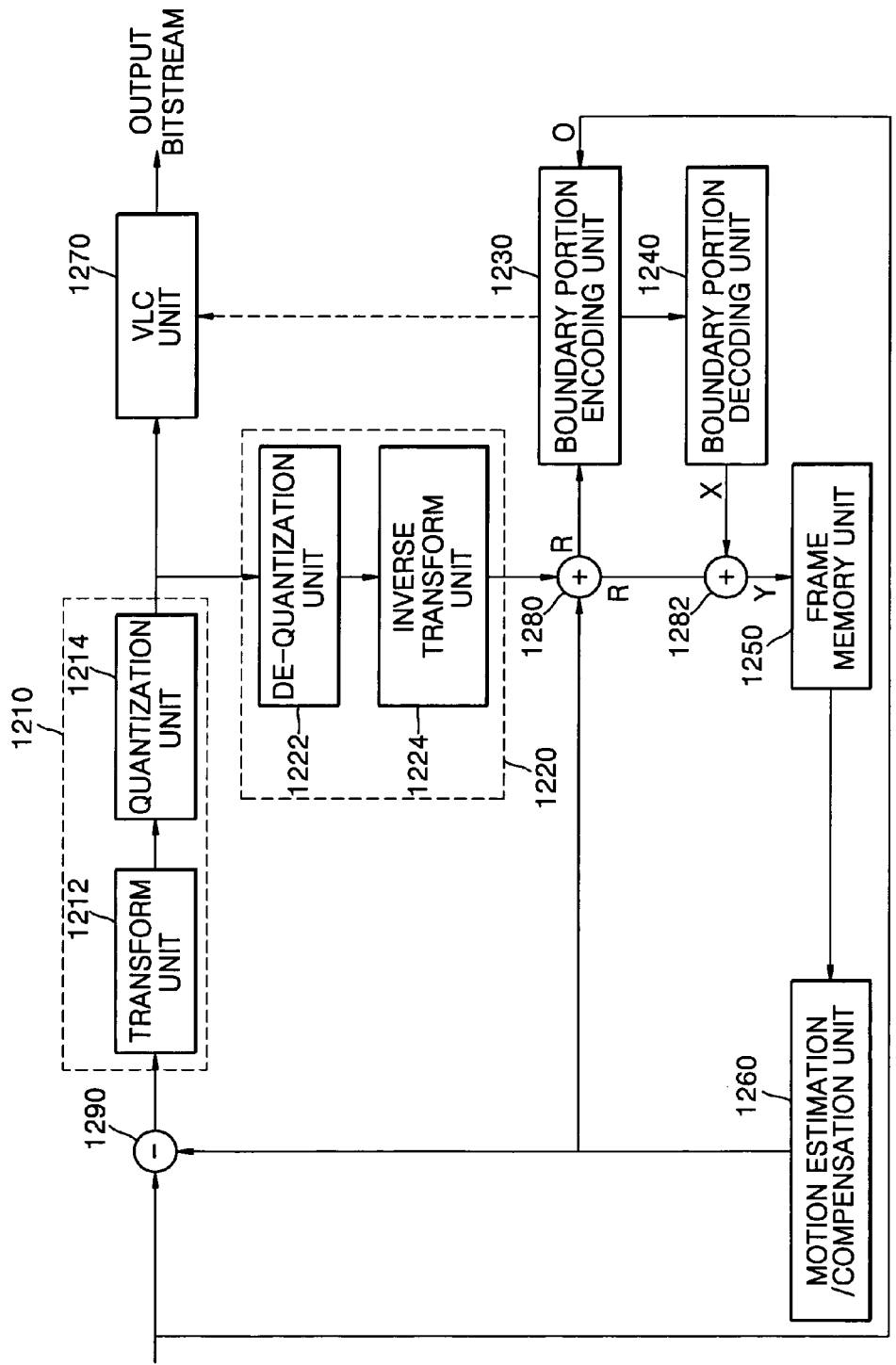
FIG. 12 is a block diagram of an encoding apparatus according to another embodiment of the present invention.

FIG. 12 is a block diagram of an encoding apparatus according to another exemplary embodiment of the present invention. The encoding apparatus of FIG. 12 includes a boundary portion decoding unit in addition to the encoding apparatus of FIG. 8 or boundary portion encoding and decoding units in addition to an MPEG2 encoder. In the present exemplary embodiment, for the sake of convenience, an MPEG2 encoder-based encoding apparatus is described. However, an H.264, VC1, or MPEG4 codec encoder, which performs a quantization operation, may also be employed.

The encoding apparatus of FIG. 12 includes a first encoding unit 1210, a first decoding unit 1220, a boundary portion encoding unit 1230, a boundary portion decoding unit 1240, a frame memory unit 1250, a motion estimation/compensation unit 1260, a VLC unit 1270, a first addition unit 1280, a second addition unit 1282, and a subtraction unit 1290. In the present exemplary embodiment, the first encoding unit 1210 includes a transform unit 1212 and a quantization unit 1214, and the first decoding unit 1220 includes a de-quantization unit 1222 and an inverse transform unit 1224.

The transform unit 1212 performs a predetermined transform operation, such as a DCT transform or an integer transform operation, on input image data in predetermined block units, for example, 8×8 blocks, to secure spatial redundancy.

The quantization unit 1214 quantizes the image data transformed by the transform unit 1212 using the first quantization coefficient. The de-quantization unit 1222 de-quantizes the image data quantized by the quantization unit 1214.

The inverse transform unit 1224 performs an inverse transform operation on the image data de-quantized by the de-quantization unit 1222.

The first addition unit 1280 adds the image data inverse-transformed by the inverse transform unit 1224 to image data received from the motion estimation/compensation unit 1260 and generates a reconstructed image R. The reconstructed image data R is input to the boundary portion encoding unit 1230.

The boundary portion encoding unit 1230 calculates the difference between a partial image of a block boundary portion of the reconstructed image R and a partial image of an input original image, which corresponds to the image of the block boundary portion of the reconstructed image R, encodes the difference using the second quantization coefficient smaller than the first quantization coefficient, and outputs encoded difference to the boundary portion decoding unit 1240. An exemplary embodiment of the boundary portion encoding unit 1230 is illustrated in FIG. 4.

The boundary portion decoding unit 1240 receives the encoded difference encoded by the boundary portion encoding unit 1230 and outputs decoded partial image difference data X. The decoded partial image difference data X is [O−R]′, that is, a quantized/de-quantized value of O−R. An exemplary embodiment of the boundary portion decoding unit 1240 is illustrated in FIG. 10.

The second addition unit 1282 adds the reconstructed image R output from the first addition unit 1280 to the decoded partial image difference data X output from the boundary portion decoding unit 1240 and outputs an image Y obtained from the addition (Y=R+X) to the frame memory unit 1370.

The frame memory 1250 stores the image Y generated by the second addition unit 1282 in units of frames.

The motion estimation/compensation unit 1260 estimates a motion vector for each macroblock and a sum of absolute differences (SAD) using image data of a current frame and image data of a previous frame stored in the frame memory unit 1250 and performs motion compensation.

The subtraction unit 1290 generates error image data based on an input image and an input from the motion estimation/compensation unit 1260.

Here, an image input from the second addition unit 1282 to the frame memory unit 1250 is Y=R+[O−R]′. [O−R]′ is a quantized/de-quantized value of O−R and can be expressed as the difference between the original image O and the reconstructed image R″ transformed after quantization/de-quantization. That is, Y=R+O−R″.

In addition, since the boundary portion encoding unit 1230 quantizes using a relatively small second quantization coefficient, R−R″ produces a value close to zero. Thus, Y=O−R−R″=0. In other words, the image Y input to the frame memory 1250 unit has a value close to the original image O in the case of block boundary images such as those illustrated in FIGS. 3, 5, and 6. Therefore, the motion estimation/compensation unit 1260 and the subtraction unit 1290 can respectively perform motion estimation and error image generation more elaborately in a block boundary portion, thereby resulting in a dramatic decrease in the blocking phenomenon.

The VLC unit 1270 removes statistical redundancy of quantized image data. The boundary portion encoding unit 1230 may output encoded data to the VLC unit 1270.

The boundary portion encoding unit 1230 and the boundary portion decoding unit 1240 may respectively adaptively encode and decode the difference between partial images only when the difference exceeds a predetermined threshold. For example, if the difference calculated in units of macroblocks does not exceed the predetermined threshold, the boundary portion encoding unit 1230 and the boundary portion decoding unit 1240 may be disabled.

As described above, a reference image is generated by adaptively reflecting errors in block boundary portions, and motion compensation is performed using this reference image. Consequently, the blocking phenomenon that occurs when image data is decoded can be reduced without increasing the number of bits transmitted. In addition, the propagation of the blocking phenomenon in the block boundary portion can be prevented.

Figure 13:
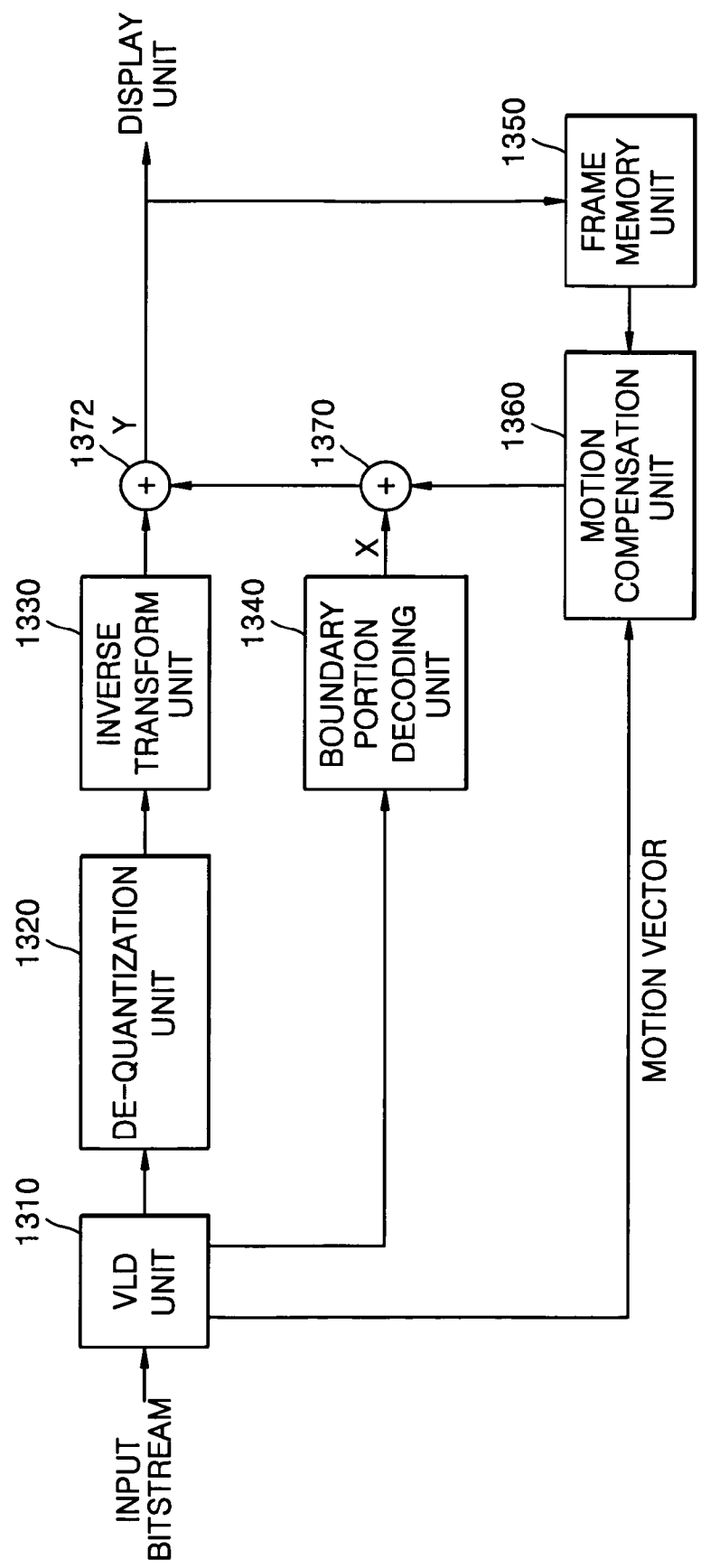
FIG. 13 is a block diagram of a decoding apparatus according to another embodiment of the present invention.

FIG. 13 is a block diagram of a decoding apparatus according to another exemplary embodiment of the present invention. The decoding apparatus of FIG. 13 corresponds to the encoding apparatus of FIG. 12 and includes a boundary portion decoding unit in addition to an MPEG2, H.264, VC1, or MPEG4 codec encoder. Referring to FIG. 13, the decoding apparatus includes a first VLD unit 1310, a de-quantization unit 1320, an inverse transform unit 1330, a boundary portion decoding unit 1340, a frame memory unit 1350, a motion compensation unit 1360, and addition units 1370 and 1372.

The first VLD unit 1310 variable-length-decodes an encoded bit stream and extracts image data, motion vector information, and encoded difference of partial images. The extracted image data is input to the de-quantization unit 1320, the extracted partial image difference data is input to the boundary portion decoding unit 1340, and the motion vector information is input to the motion compensation unit 1360.

The de-quantization unit 1320 de-quantizes the image data quantized using the first quantization coefficient. The inverse transform unit 1330 performs an inverse transform operation on the de-quantized image data.

The boundary portion decoding unit 1340 decodes the partial image difference data received from the first VLD unit 1310. The partial image difference data is data encoded using the second quantization coefficient smaller than the first quantization coefficient. An exemplary embodiment of the boundary portion decoding unit 1340 is illustrated in FIG. 10.

The addition units 1370 and 1372 add values received from the inverse transform unit 1330, the motion compensation unit 1360, and the boundary portion decoding unit 1340 and generates the image Y, that is, R+X, illustrated in FIG. 12. In this case, R denotes a value obtained after an output value of the motion compensation unit 1360 and that of the inverse transform unit 1330 are added, and X denotes an output value of the boundary portion decoding unit 1340.

As described above with reference to FIG. 12, since boundary portion images of images stored for decoding can be obtained more accurately, the blocking phenomenon can be reduced and prevented from being propagated.

As described above, in an encoding and decoding method according to an exemplary embodiment of the present invention, since error information of a block boundary portion is separately encoded and transmitted, the blocking phenomenon can be reduced so that it takes only a small number of bits.

When the error information of the block boundary portion is generated, the block boundary portion is adaptively encoded according to a degree of error. Thus, it is possible to minimize an increase in the amount of computation and transmission bits required for encoding and decoding units.

In addition, when the present invention is applied to a region that requires a more elaborate image reconstruction, the image quality of the region on the same screen can selectively be enhanced with a small number of bits.

Furthermore, by using a reference image having a corrected block boundary portion, motion compensation and error image generation can be performed more elaborately in the block boundary portion. Consequently, the blocking phenomenon and propagation thereof can be prevented and significantly reduced.

The present invention can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet).

The computer-readable recording medium can also be distributed over network-coupled computer systems so that the computer-readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image encoding method comprising:
   performing a first encoding operation on an input image using a first quantization coefficient;
   generating a reconstructed partial image obtained from a block boundary portion of the first-encoded input image; and
   performing a second encoding operation on a difference between the reconstructed partial image obtained from a block boundary portion of the first-encoded input image and a corresponding partial image of a block boundary portion of the input image, using a second quantization coefficient smaller than the first quantization coefficient,
   wherein the second encoding operation is performed when a difference between a predetermined portion of the input image and a reconstructed image of the predetermined portion meets a predetermined condition.

2. The method of claim 1, wherein the reconstructed partial image is obtained from an image which is reconstructed from the first-encoded input image.

3. The method of claim 1, wherein the reconstructed partial image is obtained from reconstructing a corresponding portion of the first-encoded input image.

4. The method of claim 1, wherein the second encoding operation is performed only when a predetermined condition is satisfied.

5. The method of claim 4, wherein the second encoding operation is performed only when a difference between a predetermined portion of the input image and a reconstructed image of the predetermined portion exceeds a predetermined threshold; and wherein the reconstructed image of the predetermined portion is obtained from an image which is reconstructed from the first-encoded input image.

6. The method of claim 5, wherein the predetermined portion of the input image is identical to the corresponding partial image of the input image.

7. The method of claim 1, wherein the corresponding partial image comprises a block boundary portion of the input image.

8. The method of claim 1, wherein the first encoding operation comprises:
performing a first transform operation on the input image; and
performing a first quantization operation on the input image on which the first transform operation is performed, using the first quantization coefficient,
wherein the generation of the reconstructed partial image comprises:
performing a de-quantization operation on a portion of the first-encoded input image, wherein the portion corresponds to the reconstructed partial image; and
performing an inverse transform operation on the portion on which the de-quantization operation is performed.

9. The method of claim 1, wherein the second encoding operation comprises:
performing a second transform operation on the difference; and
performing a second quantization operation, using the second quantization coefficient, on the difference on which the second transform operation is performed.

10. The method of claim 9, further comprising variable-length-coding at least one of the first-encoded image and the second-encoded difference.

11. The method of claim 1, wherein the first-encoded image and the second-encoded difference are separately variable-length-coded.

12. The method of claim 11, further comprising multiplexing the separately variable-length-coded image and difference.

13. The method of claim 1, wherein the first-encoded image is transmitted to a base layer of the input image and the second-encoded difference is transmitted to an enhanced layer of the input image.

14. The method of claim 1, wherein the first encoding operation is performed by a predetermined codec that performs a quantization operation.

15. The method of claim 1, further comprising:
decoding the second-encoded difference; and
performing motion compensation using the decoded second-encoded difference.

16. An image encoding method comprising:
performing a first encoding operation on an input image using a first guantization coefficient;
generating a reconstructed partial image of the first-encoded input image; and
performing a second encoding operation on a difference between the reconstructed partial image and a corresponding partial image of the input image, using a second guantization coefficient smaller than the first guantization coefficient,
wherein the reconstructed partial image is obtained from reconstructing a corresponding portion of the first-encoded input image,
wherein the second encoding operation is performed only when a difference between a predetermined portion of the input image and a reconstructed image of the predetermined portion exceeds a predetermined threshold,
wherein the reconstructed image of the predetermined portion is obtained from an image which is reconstructed from the first-encoded input image, and
wherein the predetermined portion comprises an adjacent portion of the corresponding partial image.

17. An image encoding apparatus comprising:
a first encoding unit which performs a first encoding operation on an input image using a first quantization coefficient; and
a second encoding unit which performs a second encoding operation on a difference between a reconstructed partial image obtained from a block boundary portion of the first-encoded input image and a corresponding partial image of a block boundary portion of the input image, using a second quantization coefficient smaller than the first quantization coefficient,
wherein the second encoding operation is performed when a difference between a predetermined portion of the input image and a reconstructed image of the predetermined portion meets a predetermined condition.

18. The apparatus of claim 17, further comprising a reconstructed image generating unit which generates the reconstructed partial image.

19. The apparatus of claim 17, wherein the second encoding unit is further configured to perform the second encoding operation only when a predetermined condition is satisfied.

20. The apparatus of claim 19,
wherein the second encoding operation is performed only when a difference between a predetermined portion of the input image and a reconstructed image of the predetermined portion exceeds a predetermined threshold; and
wherein the reconstructed image of the predetermined portion is obtained from an image which is reconstructed from the first-encoded input image.

21. The apparatus of claim 20, wherein the predetermined portion of the input image is identical to the corresponding partial image of the input image.

22. The apparatus of claim 17, wherein the corresponding partial image comprises a block boundary portion of the input image.

23. The apparatus of claim 17, wherein the first encoding unit comprises:
a first transform unit which performs a first transform operation on the input image; and
a first quantization unit which performs a first quantization operation on the input image on which the first transform operation is performed, using the first quantization coefficient,
wherein a reconstructed image generating unit comprises:
a de-quantization unit which performs a de-quantization operation on a portion of the first-encoded input image, wherein the portion corresponds to the reconstructed partial image; and
an inverse transform unit which performs an inverse transform operation on the portion on which the dequantization operation is performed.

24. The apparatus of claim 17, wherein the second encoding unit comprises:
a second transform unit which performs a second transform operation on the difference; and
a second quantization unit which performs a second quantization operation, using the second quantization coefficient, on the difference on which the second transform operation is performed.

25. The apparatus of claim 24, further comprising a variable-length-coding (VLC) unit which variable-length-codes at least one of the first-encoded image and the second-encoded difference.

26. The apparatus of claim 17, further comprising at least one VLC unit which variable-length-codes the first-encoded image and the second-encoded difference, separately.

27. The apparatus of claim 26, wherein a selected VLC unit out of the at least one VLC unit is configured to multiplex the first-encoded image and the second-encoded difference which are separately variable-length-coded.

28. The apparatus of claim 17, wherein the first-encoded image is transmitted to a base layer of the input image and the second-encoded difference is transmitted to an enhanced layer of the input image.

29. The apparatus of claim 17, wherein the first encoding unit comprises a predetermined codec that performs a quantization operation.

30. The apparatus of claim 17, further comprising:
a decoding unit which decodes the second-encoded difference; and
a motion compensation unit which performs motion compensation using the decoded second-encoded difference.

31. An image encoding apparatus comprising:
a first encoding unit which performs a first encoding operation on an input image using a first quantization coefficient; and
a second encoding unit which performs a second encoding operation on a difference between a reconstructed partial image and a corresponding partial image of the input image, using a second quantization coefficient smaller than the first quantization coefficient,
wherein the second encoding unit is further configured to perform the second encoding operation only when a predetermined condition is satisfied,
wherein the second encoding operation is performed only when a difference between a predetermined portion of the input image and a reconstructed image of the predetermined portion exceeds a predetermined threshold,
wherein the reconstructed image of the predetermined portion is obtained from an image which is reconstructed from the first-encoded input image, and
wherein the predetermined portion comprises an adjacent portion of the corresponding partial image.

32. An image decoding method comprising:
performing a first decoding operation on image data of an input bitstream comprising an encoded image;
performing a second decoding operation on difference data of the input bitstream,
wherein the difference data is obtained by encoding a difference between a partial image of a block boundary portion of the image and a corresponding reconstructed partial image obtained from a block boundary portion of the encoded image; and
wherein the corresponding reconstructed partial image is obtained by decoding a corresponding portion of the encoded image; and
generating a reconstructed image using the first-decoded image data and the second-decoded difference data,
wherein the encoded image is encoded by a method comprising a second encoding operation wherein the second encoding operation is performed when a difference between a predetermined portion of the input image and a reconstructed image of the predetermined portion meets a predetermined condition.

33. The method of claim 32, wherein the partial image comprises a block boundary portion of the image.

34. The method of claim 32, wherein the first decoding operation comprises:
performing a first de-quantization operation on the image data; and
performing a first inverse transform operation on the image data on which the first de-quantization operation is performed, and
wherein the second decoding operation comprises:
performing a second de-quantization operation on the difference data; and
performing a second inverse transform operation on the difference data on which the second de-quantization operation is performed.

35. The method of claim 32, further comprising at least one of:
(a) variable-length-decoding the input bitstream, and extracting the image data and the difference data from the input stream; and
(b) variable-length-decoding the difference data for the second decoding operation.

36. method of claim 32, wherein the reconstructed image is used for motion compensation of another image.

37. The method of claim 32, wherein the image data of the input stream for the first decoding comprises motion vector information.

38. An image decoding apparatus comprising:
a first decoding unit which performs a first decoding operation on image data of an input bitstream comprising an encoded image;
a second decoding unit which performs a second decoding operation on difference data of the input bitstream,
wherein the difference data is obtained by encoding a difference between a partial image of a block boundary portion of the image and a corresponding reconstructed partial image obtained from a block boundary portion of the encoded image; and
wherein the corresponding reconstructed partial image is obtained by decoding a corresponding portion of the encoded image; and
a reconstructed image generating unit which generates a reconstructed image using the first-decoded image data and the difference data on which the second decoding operation is performed,
wherein the encoded image is encoded by a method comprising a second encoding operation wherein the second encoding operation is performed when a difference between a predetermined portion of the input image and a reconstructed image of the predetermined portion meets a predetermined condition.

39. The apparatus of claim 38, wherein the partial image comprises a block boundary portion of the image.

40. The apparatus of claim 38, wherein the first decoding unit comprises:
a first de-quantization unit which performs a first de-quantization operation on the image data; and
a first inverse transform unit which performs a first inverse transform operation on the image data on which the first de-quantization operation is performed,
wherein the second decoding unit comprises:
a second de-quantization unit which performs a second de-quantization on the difference data; and
a second inverse transform unit which performs a second inverse transform operation on the difference data on which the second de-quantization operation is performed.

41. The apparatus of claim 38, further comprising at least one of:
- (a) a variable-length-decoding unit which variable-length-decodes the input bitstream, and extracts the image data and the difference data from the input stream; and
- (b) a variable-length-decoding unit which variable-length-decodes the difference data for the second decoding operation.

42. The apparatus of claim 38, further comprising:
a motion compensation unit which uses the reconstructed image for motion compensation of another image.

43. The apparatus of claim 38, wherein the image data of the input stream for the first decoding comprises motion vector information.

44. A tangible computer-readable recording medium on which a program for executing an image encoding method is recorded, the method comprising:
performing a first encoding operation on an input image using a first quantization coefficient;
generating a reconstructed partial image of the first-encoded input image; and
performing a second encoding operation on a difference between the reconstructed partial image obtained from a block boundary portion of the first-encoded input image and a corresponding partial image of a block boundary portion of the input image, using a second quantization coefficient smaller than the first quantization coefficient,
wherein the second encoding operation is performed when a difference between a predetermined portion of the input image and a reconstructed image of the predetermined portion meets a predetermined condition.

45. The medium of claim 44, wherein the corresponding partial image comprises a block boundary portion of the input image.

46. The medium of claim 44, wherein the first encoding operation comprises:
performing a first transform operation on the input image; and
performing a first quantization operation on the input image on which the first transform operation is performed, using the first quantization coefficient, and
wherein the generation of the reconstructed partial image comprises:
performing a de-quantization operation on a portion of the first-encoded input image, wherein the portion corresponds to the reconstructed partial image; and
performing an inverse transform operation on the portion on which the de-quantization operation is performed.

47. The medium of claim 44, wherein the second encoding operation comprises:
performing a second transform operation on the difference; and
performing a second quantization operation, using the second quantization coefficient, on the difference on which the second transform operation is performed.

48. The medium of claim 44, wherein the second encoding operation is performed only when a predetermined condition is satisfied.

49. The medium of claim 48, wherein the second encoding operation is performed only when a difference between a predetermined portion of the input image and a reconstructed image of the predetermined portion exceeds a predetermined threshold; and
wherein the reconstructed image of the predetermined portion is obtained from an image which is reconstructed from the first-encoded input image.

50. The medium of claim 49, wherein the predetermined portion of the input image is identical to the corresponding partial image of the input image.

51. The medium of claim 44, further comprising:
decoding the second-encoded difference; and
performing motion compensation using the decoded second-encoded difference.

52. A tangible computer-readable recording medium on which a program for executing an image decoding method is recorded, the method comprising:
performing a first decoding operation on image data of an input bitstream comprising an encoded image;
performing a second decoding operation on difference data of the input bitstream, wherein the difference data is obtained by encoding a difference between a partial image of a block boundary portion of the image and a corresponding reconstructed partial image obtained from a block boundary portion of the encoded input image; and
wherein the corresponding reconstructed partial image is obtained by decoding a corresponding portion of the encoded image; and
generating a reconstructed image using the first-decoded image data and the second-decoded difference data,
wherein the encoded image is encoded by a method comprising a second encoding operation wherein the second encoding operation is performed when a difference between a predetermined portion of the input image and a reconstructed image of the predetermined portion meets a predetermined condition.

53. The medium of claim 52, wherein the partial image comprises a block boundary portion of the image.

54. The medium of claim 52, wherein the first decoding operation comprises:
performing a first de-quantization operation which corresponds to a first quantization operation performed using the first quantization coefficient on the image data; and
performing a first inverse transform operation on the image data on which the first de- quantization operation is performed, and
wherein the second decoding operation comprises:
performing a second de-quantization operation on the difference data; and
performing a second inverse transform operation on the difference data on which the second de-quantization operation is performed.

55. The medium of claim 52, wherein the reconstructed image is used for motion compensation of another image.

* * * * *